April 15, 1958  W. S. KARN  2,830,454
POSITIVELY SEALED COUPLING
Filed Aug. 17, 1955
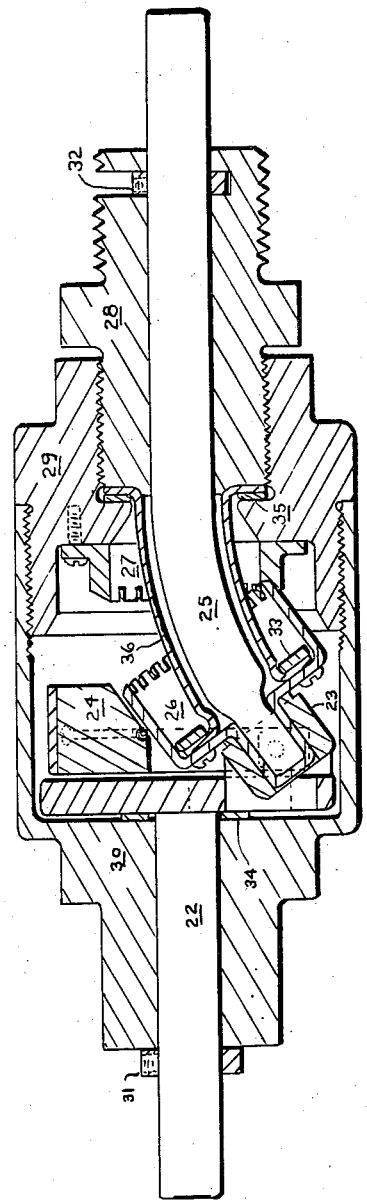
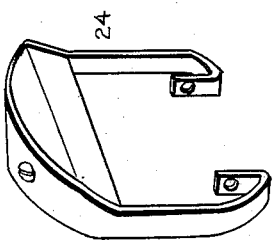
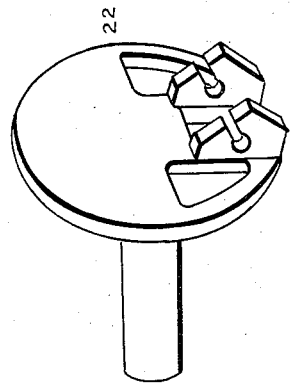
INVENTOR.
William Snyder Karn

2,830,454
POSITIVELY SEALED COUPLING

William Snyder Karn, East Hartford, Conn.

Application August 17, 1955, Serial No. 529,039

3 Claims. (Cl. 74—18)

My invention relates to rotating shaft seals and to methods of construction and use of the same and relates to improvements in the shaft seals described and claimed in my copending application, Serial No. 504,942 filed April 29, 1955.

An object of my invention is to transmit torque into a system while still allowing positive and integral closure of the system.

Another object of my invention is to transmit mechanical work into a positively closed system without changing the volume of the system.

Another object of my invention is to obtain unlimited travel of a mechanism while positively sealing it from the corresponding driving or driven mechanism.

Other objects and a fuller understanding of the invention may be had by referring to the following description and claims, taken in conjunction with the accompanying drawing in which:

Figure 1 shows a longitudinal cross-sectional view of a positively sealed coupling;

Figure 2 shows a driving shaft with a static bearing surface;

Figure 3 shows a moveable eccentric bearing surface unit; and

Figure 4 shows a counterweight.

In Figure 1 rotating members are a driving shaft 22, a radially moveable eccentric bearing surface 23, a counterweight 24, a driven shaft 25, and two rings 31 and 32. Piece 26 is a toothed oscillating member whose skirt rocks around the toothed rim of frame gear 27. The flexible envelope 36 attaches integrally with the oscillating member 26 and with a nipple 28 of the coupling frame. The unit designated as the driving shaft 22 is shown in the perspective drawing of Figure 2. The driving shaft has two angular projections extending from its wheel face, and the wheel is cut through between the projections. The aperture provides a static bearing surface for tangential force that is transmitted to an eccentric bearing surface of piece 23. The cubical piece 23 is shown in perspective in Figure 3. The drilled interior of piece 23 is referred to as an eccentric bearing surface by reason of its eccentric mounting on piece 22. The coupling may be driven from either end. For the purpose of describing its manner of functioning the shaft 22 is referred to as the driving shaft and shaft 25 is referred to as the driven shaft. The drilled interior of piece 22 is referred to as a first eccentric bearing surface and the smaller eccentric cylindrical end of shaft 25 is referred to as a second eccentric bearing surface. Piece 24 is a counterweight which balances the eccentric masses of pieces 23, 25, 26, 33 and 36. The arms of piece 23 are smaller in diameter than the holes through which they fit in piece 22. Consequently, piece 23 has some freedom of radial movement, allowing centrifugal force of counterweight 24 to bear against the eccentric masses.

Nipple 28 functions as a bearing for driven shaft 25. In addition, by means of the assembly threads and the internal shoulder on frame piece 29 and washer 35, the nipple holds flexible envelope 36 hermetically against itself.

The rings 31 and 32 are held with set screws and serve to prevent drifting of shafts 22 and 25. Washer 34 is a spacer. Piece 30 is part of the frame. Ring 33 receives screws which cause it to press the flexible envelope 36 hermetically against oscillating member 26.

Revolution of shaft 22 applies tangential force to and imparts rotary movement to the eccentric bearing of piece 23 and likewise to the eccentric bearing end of driven shaft 25. Force is transmitted through the protuberance of the intervening, nonrotating, oscillating member which is cap 26. Its teeth, meshing with frame gear 27, prevent twisting of the flexible envelope 36 as claimed in my copending application, Serial No. 504,942 filed April 29, 1955. Centrifugal force developed in the eccentric mass associated with pieces 23, 25, 26, 33, and 36 is balanced by counterweight 24 through movement of the eccentric bearing surface of piece 23. The mobility of piece 23, in addition to its balancing function, facilitates assembly and fitting of the parts of the seal.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:

1. A coupling having a driving shaft and a driven shaft, driving force being transmitted through an eccentric bearing surface of said driving shaft, said eccentric bearing surface transmitting torque to a second eccentric bearing surface of said driven shaft through an intervening, nonrotating, oscillating member, said oscillating member being integrally joined with one end of a flexible envelope, said oscillating member and flexible envelope completing the integral closure of the driven shaft and associated actuated system from the driving shaft, said oscillating member being restrained from twisting by a gear restraint mechanism.

2. A coupling as described in claim 1, the gear restraint mechanism comprising a gear surface attached to said oscillating member, said gear surface meshing with and rolling upon a second gear surface, the two gear surfaces having equal pitch diameters, said second gear surface being immovable.

3. A coupling as described in claim 1, said driven shaft being curved from its rotational axis to the axis of said second eccentric bearing surface, the curvature being substantially constant and extending substantially over the entire eccentric portion of the driven shaft not containing bearing surface.

References Cited in the file of this patent
UNITED STATES PATENTS

| | | |
|---|---|---|
| 790,374 | Maxwell | May 23, 1905 |
| 1,736,974 | King | Nov. 26, 1929 |
| 2,307,518 | Larsen | Jan. 5, 1943 |
| 2,610,410 | L'Abee-Lund | Sept. 16, 1952 |
| 2,784,597 | Miller | Mar. 12, 1957 |

FOREIGN PATENTS

| | | |
|---|---|---|
| 217,306 | Switzerland | Oct. 15, 1941 |